United States Patent
Klein

Patent Number: 6,134,609
Date of Patent: Oct. 17, 2000

[54] METHOD FOR USING COMPUTER SYSTEM MEMORY AS A MODEM DATA BUFFER BY TRANSFERRING MODEM I/O DATA DIRECTLY TO SYSTEM CONTROLLER AND TRANSFERRING CORRESPONDING SYSTEM CONTROLLER DATA DIRECTLY TO MAIN MEMORY

[75] Inventor: Dean A. Klein, Eagle, Id.

[73] Assignee: Micron Electronics, Inc., Nampa, Id.

[21] Appl. No.: 09/052,875

[22] Filed: Mar. 31, 1998

[51] Int. Cl.[7] .............................. G06F 13/38; G06F 13/14
[52] U.S. Cl. .................................. 710/52; 710/4; 710/33; 710/65; 710/71
[58] Field of Search .............................. 710/1, 4, 33, 52, 710/65, 71

[56] References Cited

U.S. PATENT DOCUMENTS

| | | | |
|---|---|---|---|
| 4,677,492 | 6/1987 | Fellerer | 358/257 |
| 5,404,351 | 4/1995 | Inoue | 370/24 |
| 5,450,530 | 9/1995 | Snyder et al. | 375/220 |
| 5,537,654 | 7/1996 | Bedingfield et al. | 710/14 |
| 5,572,148 | 11/1996 | Lytle et al. | 326/41 |
| 5,627,990 | 5/1997 | Cord et al. | 395/449 |
| 5,696,600 | 12/1997 | Perkins | 358/442 |
| 5,754,590 | 5/1998 | Bays et al. | 375/222 |
| 5,768,628 | 6/1998 | Priem | 395/882 |
| 5,787,305 | 7/1998 | Chen | 395/823 |
| 5,797,028 | 8/1998 | Gulick et al. | 712/32 |
| 5,802,483 | 9/1998 | Morris | 455/557 |
| 5,822,553 | 10/1998 | Gifford et al. | 710/129 |
| 5,905,861 | 5/1999 | Lovell | 395/188.01 |

*Primary Examiner*—Thomas C. Lee
*Assistant Examiner*—Rehana Perveen
*Attorney, Agent, or Firm*—Dorsey & Whitney LLP

[57] ABSTRACT

A method and associated circuitry are described for interfacing a software-based modem in a computer system. Memory/modem interface circuitry is integrated within a system controller coupling a main memory with a microprocessor. A dedicated region of the main memory is configured as separate transmit data and received data buffer regions. Buffer address registers included within the system controller store values pointing to address locations within the buffer regions of the memory for next data in and next data out. The values programmed in these registers are incremented responsive to associated data transfers in/out of the buffer regions, and the transmit data and received data buffer regions function as FIFOs. The frequency and duration of processor utilization imposed by software-based modems is significantly reduced, due to FIFO operations functioning at main memory access speed.

31 Claims, 2 Drawing Sheets

METHOD FOR USING COMPUTER SYSTEM MEMORY AS A MODEM DATA BUFFER BY TRANSFERRING MODEM I/O DATA DIRECTLY TO SYSTEM CONTROLLER AND TRANSFERRING CORRESPONDING SYSTEM CONTROLLER DATA DIRECTLY TO MAIN MEMORY

TECHNICAL FIELD

The present invention relates generally to protocols associated with the interface of a modem in a computer system, and more particularly, to methods associated with the interface of a software-based modem in a computer system.

BACKGROUND OF THE INVENTION

The use of computers, especially personal computers (PCs), is widespread. Increasingly, PCs are equipped with a modem, which allows a user to link one computer with another for purposes of sharing data. Modems modulate digital data from one computer to an analog audio signal for transmission to another computer via the publicly switched telephone network (PSTN). Modems receiving the analog audio signal then demodulate the signal and reconstruct the digital data.

A modem may be a device external to a PC, which is then connected to one of the serial communications ports on the PC. Alternatively, modem circuitry may be included within the PC, typically on a printed circuit board or card connected to one of the PC bus slots, such as an industry standard architecture (ISA) bus slot. Both external and internal modems traditionally include a number of well-known circuits, such as a universal asynchronous receiver/transmitter (UART), a digital signal processor (DSP), a microcontroller, a coder/decoder (CODEC), and a phone line interface such as data access arrangement (DAA) circuitry.

With the availability of high-speed processors such as the Pentium® processor, software-based modems have been made possible by the DSP-like instruction sets executable by these processors. Thus, much of the DSP functionality can be replaced by software execution, thereby reducing the hardware requirements for the modem itself. Software-based modems require a circular buffer, or memory arranged as a first-in-first-out (FIFO) memory, for both the transmitted and received data. Such FIFOs are required because the speed at which data is transmitted or received by a modem is typically greater than the data processing speed of a PC running a commercially available operating system, such as Windows NT or Windows 95.

Circuitry associated with currently available software-based modems is typically coupled with the ISA bus, although newly available modems are available for coupling with the peripheral component interconnect (PCI) bus. These modems require application specific integrated circuitry (ASIC) coupling the modem CODEC with the associated bus, providing the necessary control signals and data routing to match the CODEC and bus protocols. The ASIC also couples the CODEC with a FIFO, which may or may not be integrated within the ASIC.

Currently available software-based modems, while improving modem performance relative to traditional external and internal hardware-based modems, still do not fully exploit the capability of today's high-speed processors.

SUMMARY OF THE INVENTION

In a computer system having a processor, a memory, a system controller coupling the processor with the memory, and modem input/output circuitry for transferring data to and from an external telephone line, an embodiment of the present invention provides a method for transferring data between the modem input/output circuitry and other components of the computer system. The method includes transferring serial data between the input/output circuitry and the system controller. Correspondingly, parallel data is transferred between the system controller and the memory. The transfer of data to or from the memory may include determining an address pointer value, accessing a corresponding location in the memory, and then changing the address pointer value (such as by incrementing the addressing pointer value).

In one embodiment, the method includes determining first and second address pointer values. If the address pointer values differ by a predetermined amount, the method then includes requesting the processor to transfer data to or from the memory. Transferring data between the processor and the memory may include first receiving a modem access address and then responsively transferring the data. Receiving a modem access address may include receiving a dedicated I/O address or a dedicated memory address.

By receiving/transmitting serial modem data in the system controller and directly transferring corresponding parallel data to/from the memory, significant improvements in processor utilization result.

DETAILED DESCRIPTION OF THE INVENTION

In the following, a method for interfacing computer circuitry and modem circuitry is described with certain specific details set forth in order to provide a sufficient understanding of the present invention. It will be clear to one skilled in the art, however, that the present invention may be practiced without these details. In other instances, well-known circuits, control signals, timing protocols, and software operations have not been described in detail in order not to unnecessarily obscure the invention.

Figure 1:
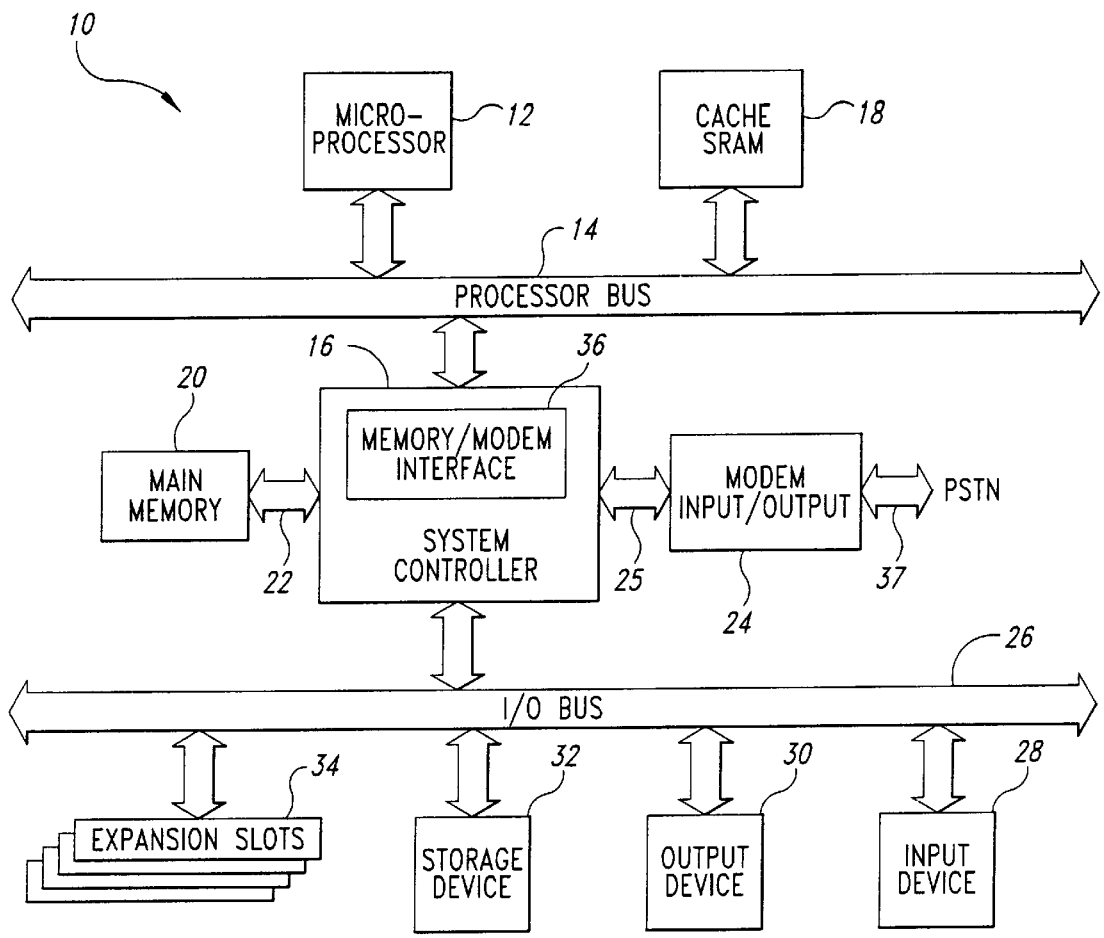
FIG. 1 is a functional block diagram of a computer system including a memory/modem interface in accordance with an embodiment of the present invention.

FIG. 1 shows an embodiment of a computer system 10 in accordance with the present invention. A microprocessor 12 is connected to a processor bus 14 which carries address, data, and control signals. The processor bus 14 is in turn connected to a system controller 16. The processor bus 14 is also connected to a cache memory 18, which is commonly a static random access memory (SRAM) device. The system controller 16 includes memory controller circuitry accessing a main memory 20 via a memory bus 22 carrying memory address, data, and control signals. The main memory 20 may include any of a wide variety of suitable memory devices, such as a dynamic random access memory (DRAM) devices, including synchronous DRAMs, SyncLink DRAMs, or Rambus DRAMs.

The system controller 16 also functions as a bridge circuit (sometimes called the North Bridge) between the processor 14 and a system bus, such as I/O bus 26. The I/O bus 26 may itself be a combination of one or more bus systems with associated interface circuitry (e.g., AGP bus and PCI bus with connected SCSI and ISA bus systems). Multiple I/O devices 28–32 are coupled with the I/O bus 26. One or more data input devices 28, such as a keyboard, mouse, etc., are coupled with the I/O bus 26. Also, one or more data output devices 30, such as visual display devices, printers, etc., are coupled with the I/O bus 26. Additionally, one or more data storage devices 32, such as disk drives, tape drives, CD-ROM drives, etc., are coupled with the I/O bus 26. Also coupled with the I/O bus 26 are expansion slots 34 to provide future accommodation of other I/O devices not selected during the original design of the computer system.

In accordance with an embodiment of the present invention, memory/modem interface circuitry 36 is integrated within the system controller 16. The memory/modem interface 36 provides an interface between the main memory 20 and modem input/output circuitry 24 via a communications bus 25. The modem input/output 24 is in turn connectable to the PSTN via a conventional telephone line 37. This configuration differs significantly from conventional computer system architectures, in which modem circuitry is coupled with the I/O bus 26.

Figure 2:
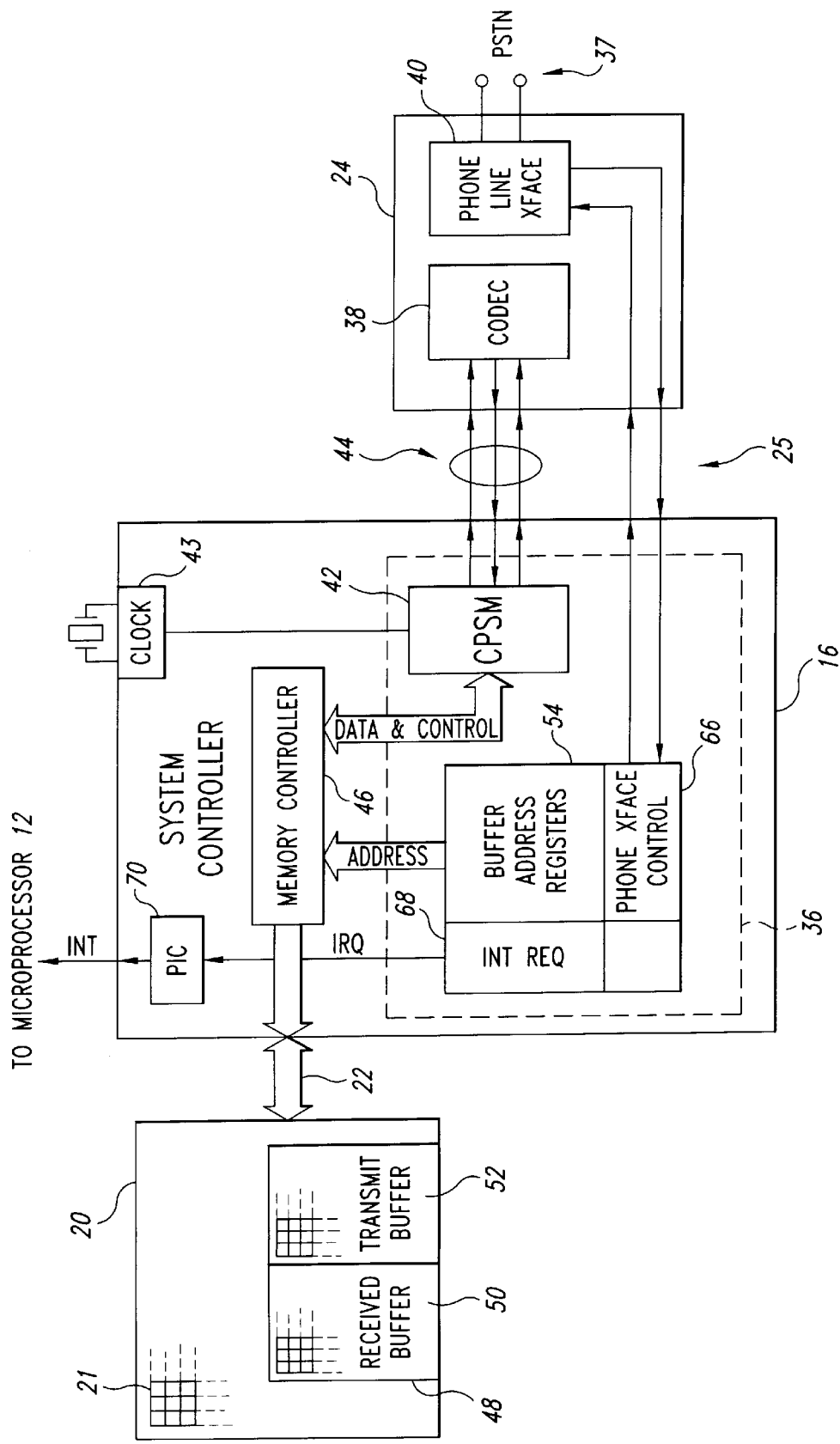
FIG. 2 is a functional block diagram showing certain details of the memory/modem interface of FIG. 1.

Referring to FIG. 2, particular embodiments of the modem input/output 24, the memory/modem interface 36, and the main memory 20 are shown. The modem input/output 24 includes modem CODEC circuitry 38 and telephone line interface circuitry 40, which may include DAA circuitry. The communications bus 25 includes a serial CODEC interface 44 for transferring digital data in a serial data stream between the CODEC 38 and the memory/modem interface 36.

The memory/modem interface 36 includes a CODEC protocol state machine (CPSM) 42, which receives a clock signal CLK from a clock circuit 43 included in the system controller 16. As will be understood by those skilled in the art, the CPSM 42 produces the requisite control signals associated with CODEC and main memory access protocols. The CPSM 42 moves digital data in a serial data stream to and from the CODEC 38 via the serial CODEC interface 44, and initiates movement of data to and from the main memory 20 in a parallel data stream. As shown in the embodiment of FIG. 2, the CPSM 42 interfaces directly with the CODEC 38 and directly controls the data stream to and from the CODEC. The CPSM 42 may similarly directly interface with the main memory 20, but preferably passes memory access control to memory controller circuitry 46 included within the system controller 16, as will be understood by those skilled in the art.

The main memory 20 includes a plurality of addressable memory locations 21 to which data can be transferred for storage and from which stored data can be retrieved. Of these memory locations 21, a particular portion or dedicated region 48 of the main memory 20 acts as circular buffers for CODEC data (i.e., data received from or to be transmitted to the CODEC 38). Data received from the CODEC is stored in a received data buffer region 50, and data to be transmitted to the CODEC is stored in a transmit data buffer region 52. The sizes of the received data buffer 50 and the transmit data buffer 52 may be selected according to values programmed in associated registers, or are preferably fixed in size. A suitable fixed buffer size is, for example, 64 kB for each of the received data and transmit data buffers 50, 52, but may alternatively be fixed at different sizes. The particular location or address range of the dedicated region 48 may be determined by a value programmed into a base-address register, or is preferably hard coded into logic circuitry included within the system controller 16, as will be understood by those skilled in the art.

Figure 3:
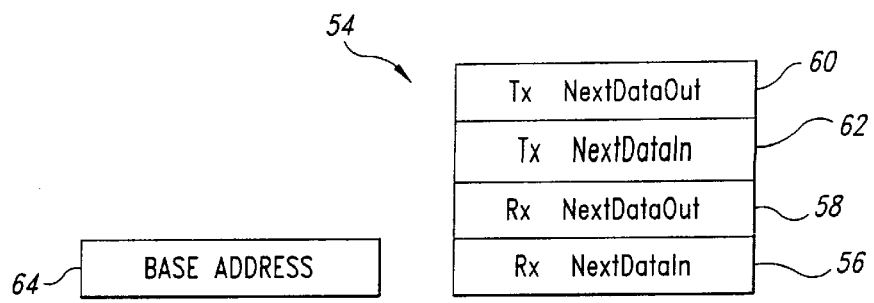
FIG. 3 is a graphical representation of a buffer address register set included in the memory/modem interface depicted in FIG. 1.

The memory/modem interface 36 includes buffer address registers 54 for storing programmable values associated with memory address locations, such as memory address pointer values, and for providing these values to the memory controller 46. Referring to FIG. 3, four registers are provided, with two registers 56, 58 associated with the received data buffer 50, and two registers 60, 62 associated with the transmit data buffer 52.

When a data word is received from the CODEC 38, the CPSM 42 arranges or initiates arrangement of the data in a parallel configuration and initiates the writing of this data word to the received data buffer region 50 of the main memory 20. An Rx NextDataIn register 56 stores a memory address pointer value associated with the memory address to which the received data word is to be written. An Rx NextDataOut register 58 stores a memory address pointer value associated with a memory address from which a previously received data word is next in line for retrieval by the microprocessor 12 or other computer system circuitry accessing CODEC data (see FIG. 1).

When data is to be transmitted to the CODEC 38, the CPSM 42 retrieves or reads a data word stored in the transmit data buffer 52 and provides it to the CODEC 38 in a serial format. A Tx NextDataOut register 60 stores a memory address pointer value associated with the memory address from which the data word is to be read. A Tx NextDataIn register 62 stores a memory address pointer value associated with the memory address to which a data word is next to be written by the microprocessor 12 or other computer system circuitry prior to subsequent transmission to the CODEC 38.

As data is read from or written to the buffers 50, 52, the corresponding register is incremented or decremented, as desired. The actual physical memory address is calculated (preferably in hardware logic) by summing a base address value 64 (whether hard coded in logic or stored in a separate register) with the contents of the appropriate one of the registers 56–62. The unit for data movement between the buffers 50, 52 and the CODEC protocol state machine 42 is preferably fixed, with a single data word sufficing. As desired, improved memory bandwidth may be attained by longer bursts of data, in which case the unit for a data movement may be multiple data words.

In accordance with the above-described embodiments of the present invention, significant performance improvements are achieved over currently available software-based modem architectures. The transfer of data between the CODEC 38 and the dedicated region 48 of the main memory 20 is performed with minimal processor operations. Once initiated, transfer of CODEC data occurs at full memory sub-system speed. The CODEC data is transferred directly between the main memory 20 and the CODEC 38 without requiring processor read/write operations. This contrasts significantly with current designs, in which a processor must regularly perform I/O read/write and corresponding memory write/read operations to effect data transfer between a modem CODEC and main memory. In accordance with the above-described embodiments, the microprocessor 12 need only perform read or write operations when the received data buffer 50 or transmit data buffer 52 is full or empty, all respectively.

The relative values of the registers 56–62 associated with each of the buffers 50, 52 indicate the status of the buffers—namely whether the buffers are full, empty, nearly full, nearly empty, etc. Correspondingly, requests for service from the microprocessor 12 and control of the phone line interface 40 are initiated as appropriate (see FIG. 2). During transmission of CODEC data, for example, the relative values stored in registers 60 and 62 might indicate that the transmit data buffer 52 is nearly empty. In this case, requesting service from the microprocessor 12 to write data to the transmit data buffer 52 avoids undue interruptions to the CODEC data stream. If the relative values stored in registers 60 and 62 indicate the transmit data buffer 52 is nearly full, operations of the phone line interface 40 are initiated to transmit CODEC data via the PSTN 37.

Referring to FIG. 2, the memory/modem interface 36 includes phone line interface controller circuitry 66 and interrupt request circuitry 68. The interrupt request circuitry 68 asserts an interrupt request signal IRQ to request execution of the appropriate interrupt service routine by the microprocessor 12. The system controller 16 may include an interrupt controller 70 for receiving the interrupt request signal IRQ and correspondingly producing an interrupt signal INT for provision to the microprocessor 12. The interrupt controller 70 may be a conventional programmable interrupt controller (PIC), an I/O advanced programmable interrupt controller (I/O APIC), or other suitable interrupt controller, and may be integrated within the system controller 16 (as shown in FIG. 2) or included elsewhere within the computer system 10.

It is desirable that access to CODEC data by the microprocessor 12 or other computer circuitry not differ significantly from current approaches. In other words, addressing the buffers 50, 52 in accordance with the above-described embodiments should appear (to the microprocessor 12, for example) much the same as addressing conventional modem circuitry coupled to the I/O bus 26. A separately dedicated I/O address or memory address range can be used for such purposes, with the address/range being set in a configuration space, as will be understood by those skilled in the art. The microprocessor 12 or other circuitry accessing CODEC data than provides this address/range, thereby initiating the address calculation described above, in which the actual physical location in the main memory 20 is determined from the contents of the registers 56–62 in the system controller 16.

Those skilled in the art will appreciate that the above-described embodiments of the present invention achieve a number of advantages over currently available software-based modem architectures. By integrating CODEC interface circuitry within the system controller 16, the requirement for a separate FIFO memory device and associated ASIC circuitry is avoided. Further, in accordance with the above-described embodiments, the microprocessor 12 has reduced cycle latency relative to conventional designs, since data may be transmitted at full memory sub-system speed. Thus, the frequency and duration of processor utilization imposed by software-based modems is significantly reduced.

From the foregoing it will be appreciated that, although specific embodiments of the invention have been described herein for purposes of illustration, various modifications may be made without deviating from the spirit and scope of the invention. As one example, the CODEC 38 could itself be integrated within the memory/modem interface circuitry 36 of the system controller 16. Accordingly, the invention is not limited by the disclosed embodiments, but instead its scope is determined by the following claims.

What is claimed is:

1. In a computer system having a processor, a main memory, a system controller coupling the processor with the main memory, and modem input/output circuitry for transferring data to and from an external telephone line, a method of transferring data between the modem input/output circuitry and other components of the computer system, comprising the steps of:

transferring serial data from the modem input/output circuitry to the system controller; and transferring parallel data corresponding to the serial data from the system controller to the main memory for storage therein.

2. A method according to claim 1 wherein the step of transferring parallel data corresponding to the serial data from the system controller to the main memory includes the steps of:

determining an address pointer value;

accessing a location in the main memory corresponding to the determined address pointer value; and changing the address pointer value.

3. A method according to claim 2 wherein the step of changing the address pointer value includes the step of incrementing the address pointer.

4. A method according to claim 2 wherein the step of accessing a location in the main memory corresponding to the determined address pointer value includes the step of combining the address pointer value with a base address value.

5. A method according to claim 1, further comprising the step of transferring the parallel data corresponding to the serial data from the memory to the processor.

6. A method according to claim 5 wherein the step of transferring the parallel data corresponding to the serial data from the memory to the processor includes the steps of:

determining an address pointer value;

accessing a location in the main memory corresponding to the determined address pointer value; and changing the address pointer value.

7. A method according to claim 6 wherein the step of changing the address pointer value includes the step of incrementing the address pointer.

8. A method according to claim 6 wherein the step of accessing a location in the main memory corresponding to the determined address pointer value includes the step of combining the address pointer value with a base address value.

9. In a computer system having a processor, a main memory, an I/O device, a system controller coupling the processor with the main memory and with the I/O device, and modem input/output circuitry for transferring data to and from an external telephone line, a method of transferring data between the modem input/output circuitry and other components of the computer system, comprising the steps of:

transferring a first serial data set from the modem input/output circuitry to the system controller;

determining a first memory address; and transferring a first parallel data set corresponding to the first serial data set from the system controller to the main memory for storage therein at a location corresponding to the first memory address.

10. A method according to claim 9, further comprising the steps of:

transferring a second serial data set from the modem input/output circuitry to the system controller; and determining a second memory address corresponding to the first memory address;

transferring a second parallel data set corresponding to the second serial data set from the system controller to the main memory for storage therein at a location corresponding to the second memory address.

11. A method according to claim 10 wherein the step of determining a second memory address includes the step of incrementing the first memory address.

12. A method according to claim 9, further comprising the steps of:

receiving a modem access address; and responsively transferring the first parallel data set from the memory to the processor.

13. A method according to claim 12 wherein the step of receiving a modem access address includes the step of receiving an I/O address.

14. A method according to claim 12 wherein the step of receiving a modem access address includes the step of receiving a memory address.

15. In an integrated system controller adapted for coupling a processor with a memory in a computer system, the computer system having a modem input/output for transferring data to and from an external telephone line, a method of transferring data between the modem input/output and the memory, comprising the steps of:

receiving a first serial data stream from the modem input/output;

converting the first serial data stream to a corresponding first parallel data stream; and transferring the first parallel data stream to the memory.

16. A method according to claim 15 wherein prior to the step of transferring the first parallel data stream to the memory, the method includes the steps of:

determining a memory base address value;

determining an address pointer value; and determining a memory address corresponding to the memory base address value and the address pointer value.

17. A method according to claim 16, further comprising the step of adjusting the address pointer value.

18. A method according to claim 15 wherein prior to the step of transferring the first parallel data stream to the memory, the method includes the steps of:

determining a first address pointer value;

determining a second address pointer value;

if the first and second address pointer values differ by a predetermined amount, requesting the processor to retrieve data from the memory.

19. A method according to claim 15, further comprising the steps of:

retrieving a second parallel data stream from the memory;

converting the second parallel data stream to a corresponding second serial data stream; and transmitting the second serial data stream to the modem input/output.

20. A method according to claim 19 wherein prior to the step of retrieving a second parallel data stream from the memory, the method includes the steps of:

determining a memory base address value;

determining an address pointer value; and determining a memory address corresponding to the memory base address value and the address pointer value.

21. A method according to claim 20, further comprising the step of adjusting the address pointer value.

22. A method according to claim 19 wherein prior to the step of retrieving a second parallel data stream from the memory, the method includes the steps of:

determining a first address pointer value;

determining a second address pointer value;

if the first and second address pointer values differ by a predetermined amount, requesting the processor to transfer data to the memory.

23. In a computer system having a processor, a main memory, a system controller coupling the processor with the main memory, and modem input/output circuitry for transferring data to and from an external telephone line, a method of transferring data between the modem input/output circuitry and other components of the computer system, comprising:

transferring serial data from the modem input/output circuitry directly to the system controller; and transferring parallel data corresponding to the serial data from the system controller directly to the main memory for storage therein.

24. A method according to claim 23 wherein the act of transferring parallel data corresponding to the serial data from the system controller to the main memory comprises:

determining an address pointer value;

accessing a location in the main memory corresponding to the determined address pointer value; and changing the address pointer value.

25. A method according to claim 24 wherein the act of accessing a location in the main memory corresponding to the determined address pointer value comprises combining the address pointer value with a base address value.

26. A method according to claim 23, further comprising the act of transferring the parallel data corresponding to the serial data from the memory to the processor.

27. A method according to claim 26 wherein the act of transferring the parallel data corresponding to the serial data from the memory to the processor comprises:

determining an address pointer value;

accessing a location in the main memory corresponding to the determined address pointer value; and changing the address pointer value.

28. In a computer system having a processor, a main memory, a system controller coupling the processor with the main memory, and modem input/output circuitry for transferring data to and from an external telephone line, a method of transferring data between the modem input/output circuitry and the processor, comprising:

transferring data from the modem input/output circuitry directly to a location in the main memory within a first block of addresses for storage therein;

transferring stored data to the processor from an address in the main memory that is within the first block of addresses;

transferring data from the processor to the main memory at a location in the main memory within a second block of addresses for storage therein; and transferring stored data to the modem input/output circuitry directly from a location in the main memory that is within the second block of address, wherein the computer system further includes a system controller coupling the modem input/output circuitry to the main memory, and wherein the act of transferring data from the modem input/output circuitry directly to a location in the main memory comprises:

transferring data from the modem input/output circuitry directly to the system controller; and transferring data corresponding to the data from the system controller directly to a location in the main memory within the first block of addresses.

29. A method according to claim 28 wherein the act of transferring data from the modem input/output circuitry to the main memory comprises:

determining an address pointer value;

accessing a location in the main memory corresponding to the determined address pointer value; and changing the address pointer value.

30. A method according to claim 29 wherein the act of accessing a location in the main memory corresponding to the determined address pointer value comprises combining the address pointer value with a base address value.

31. A method according to claim 29 wherein the act of transferring the data from the memory to the processor comprises:

determining an address pointer value;

accessing a location in the main memory corresponding to the determined address pointer value; and changing the address pointer value.

* * * * *